(12) United States Patent
Sutcu

(10) Patent No.: US 8,491,259 B2
(45) Date of Patent: Jul. 23, 2013

(54) SEAL SYSTEM BETWEEN TRANSITION DUCT EXIT SECTION AND TURBINE INLET IN A GAS TURBINE ENGINE

(75) Inventor: Muzaffer Sutcu, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1001 days.

(21) Appl. No.: 12/547,932

(22) Filed: Aug. 26, 2009

(65) Prior Publication Data
US 2011/0049812 A1 Mar. 3, 2011

(51) Int. Cl.
F01D 25/24 (2006.01)

(52) U.S. Cl.
USPC .............. 415/173.7; 415/134; 60/806

(58) Field of Classification Search
USPC .............. 415/134, 139, 170.1, 173.5, 173.7, 415/174.2, 174.3, 209.2; 60/805, 806; 277/346, 277/353, 411, 412
See application file for complete search history.

(56) References Cited

U.S. PATENT DOCUMENTS

| | | | |
|---|---|---|---|
| 3,609,968 A | 10/1971 | Mierley, Sr. et al. | |
| 4,016,718 A | 4/1977 | Lauck | |
| 4,917,302 A | 4/1990 | Steinetz et al. | |
| 5,014,917 A | 5/1991 | Sirocky et al. | |
| 5,076,590 A | 12/1991 | Steinetz et al. | |
| 5,082,293 A | 1/1992 | Steinetz et al. | |
| 5,265,412 A | 11/1993 | Bagepalli et al. | |
| 5,400,586 A | 3/1995 | Bagepalli et al. | |
| 5,749,218 A | 5/1998 | Cromer et al. | |
| 5,761,898 A | 6/1998 | Barnes et al. | |
| 5,915,697 A | 6/1999 | Bagepalli et al. | |
| 5,934,687 A | 8/1999 | Bagepalli et al. | |
| 6,039,325 A | 3/2000 | Steinetz et al. | |
| 6,345,494 B1 | 2/2002 | Coslow | |
| 6,450,762 B1 | 9/2002 | Munshi | |
| 6,502,825 B2 | 1/2003 | Aksit et al. | |
| 6,537,023 B1 | 3/2003 | Aksit et al. | |
| 6,547,257 B2 | 4/2003 | Cromer | |
| 6,619,915 B1 | 9/2003 | Jorgensen | |
| 6,648,333 B2 | 11/2003 | Aksit et al. | |
| 6,659,472 B2 | 12/2003 | Aksit et al. | |
| 6,662,567 B1 | 12/2003 | Jorgensen | |
| 6,675,584 B1 | 1/2004 | Hollis et al. | |
| 7,090,224 B2 | 8/2006 | Iguchi et al. | |
| 7,527,469 B2 * | 5/2009 | Zborovsky et al. | ............... 415/9 |
| 8,191,900 B2 * | 6/2012 | Suzuki et al. | ............... 277/433 |
| 2002/0121744 A1 | 9/2002 | Aksit et al. | |
| 2004/0031271 A1 | 2/2004 | Jorgensen | |
| 2008/0053107 A1 | 3/2008 | Weaver et al. | |

* cited by examiner

Primary Examiner — Nathaniel Wiehe
Assistant Examiner — Justin Seabe

(57) ABSTRACT

A seal apparatus in a gas turbine engine between a transition duct and a vane structure in a first row vane assembly. The seal apparatus includes a transition seal structure associated with the transition duct and a vane seal structure associated with the vane structure. The transition seal structure includes a transition base portion that defines a first axially facing surface, a first transition lip member extending axially from the first axially facing surface, and a second transition lip member radially spaced from the first transition lip member and extending axially from the first axially facing surface. The vane seal structure includes a vane base portion that defines a second axially facing surface, a first vane lip member extending axially from the second axially facing surface, and a second vane lip member radially spaced from the first vane lip member and extending axially from the second axially facing surface.

20 Claims, 8 Drawing Sheets

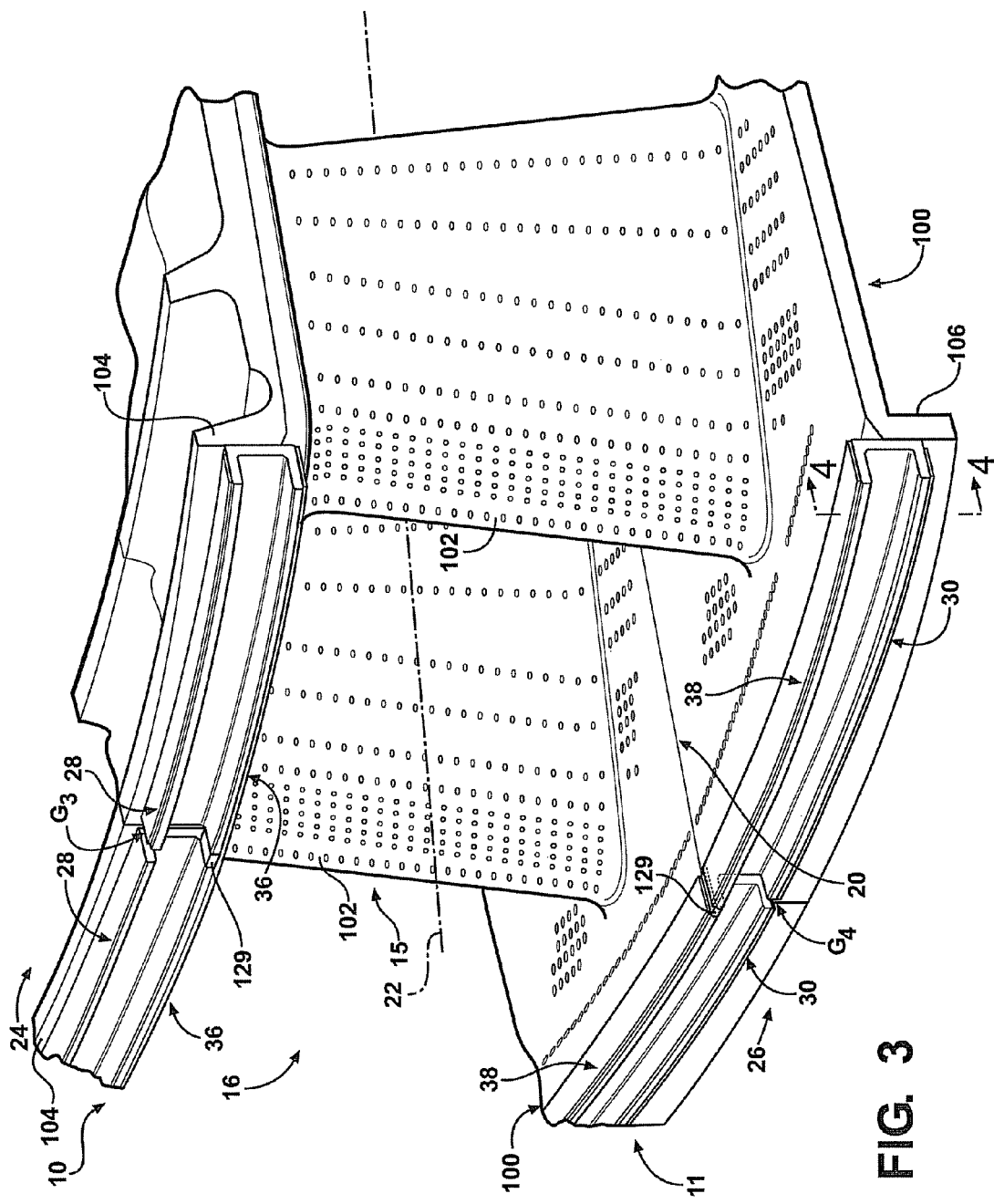

SEAL SYSTEM BETWEEN TRANSITION DUCT EXIT SECTION AND TURBINE INLET IN A GAS TURBINE ENGINE

FIELD OF THE INVENTION

The present invention relates to a seal system for use in a gas turbine engine, and, more particularly, to a seal system between a transition duct exit section and a first row vane assembly at an inlet into a turbine section.

BACKGROUND OF THE INVENTION

A conventional combustible gas turbine engine includes a compressor section, a combustion section including a plurality of combustors, and a turbine section. Ambient air is compressed in the compressor section and conveyed to the combustors in the combustion section. The combustors combine the compressed air with a fuel and ignite the mixture creating combustion products defining hot working gases that flow in a turbulent manner and at a high velocity. The working gases are routed to the turbine section via a plurality of transition ducts. Within the turbine section are rows of stationary vane assemblies and rotating blade assemblies. The rotating blade assemblies are coupled to a turbine rotor. As the working gases expand through the turbine section, the working gases cause the blades assemblies, and therefore the turbine rotor, to rotate. The turbine rotor may be linked to an electric generator, wherein the rotation of the turbine rotor can be used to produce electricity in the generator.

The transition ducts are positioned adjacent to the combustors and route the working gases into the turbine section through turbine inlet structure associated with a first row vane assembly. Because the transition ducts and the turbine inlet structure are formed from different materials, they experience different amounts of thermal growth. That is, both the transition ducts and the turbine inlet structure may move radially, circumferentially, and/or axially relative to one another as a result of thermal growth of the respective components. Thus, seal assemblies are typically used in gas turbine engines between the transition ducts and the turbine inlet structure to minimize leakage between the working gases passing into the turbine section and cooling air, i.e., cold compressor discharge air, which is used to cool structure within the gas turbine engine.

SUMMARY OF THE INVENTION

In accordance with a first aspect of the present invention, a seal apparatus is provided in a gas turbine engine between a transition duct and a vane structure in a first row vane assembly. The seal apparatus comprises a transition seal structure associated with the transition duct and a vane seal structure associated with the vane structure. The transition seal structure comprises a transition base portion associated with the transition duct and defining a first axially facing surface, a first transition lip member extending axially from the first axially facing surface of the transition base portion, and a second transition lip member radially spaced from the first transition lip member and extending axially from the first axially facing surface of the transition base portion such that a transition channel is located between the first transition lip member, the second transition lip member, and the transition base portion. The vane seal structure comprises a vane base portion associated with the vane structure and defining a second axially facing surface, a first vane lip member extending axially from the second axially facing surface of the vane base portion, and a second vane lip member radially spaced from the first vane lip member and extending axially from the second axially facing surface of the vane base portion such that a vane channel is located between the first vane lip member, the second vane lip member, and the vane base portion. The first transition lip member overlaps the first vane lip member in an axial direction and the second transition lip member overlaps the second vane lip member in the axial direction. A transition lip member is received in the vane channel or a vane lip member is received in the transition channel. The transition channel and the vane channel define a labyrinth path for fluids passing through the seal apparatus.

In accordance with a second aspect of the present invention, a seal apparatus is provided in a gas turbine engine between a transition duct and a vane structure in a first row vane assembly. The seal apparatus comprises a transition seal structure associated with the transition duct, a vane seal structure associated with the vane structure, and a seal member. The transition seal structure comprises a transition base portion associated with the transition duct and defining a first axially facing surface, a first transition lip member extending axially from the first axially facing surface, and a second transition lip member radially spaced from the first transition lip member and extending axially from the first axially facing surface. The vane seal structure comprises a vane base portion associated with the vane structure and defining a second axially facing surface, a first vane lip member extending axially from the second axially facing surface, and a second vane lip member radially spaced from the first vane lip member and extending axially from the second axially facing surface. The seal member is located between the transition seal structure and the vane seal structure and limits a leakage of fluids through the seal apparatus. The first transition lip member overlaps the first vane lip member in an axial direction and the second transition lip member overlaps the second vane lip member in the axial direction.

BRIEF DESCRIPTION OF THE DRAWINGS

FIG. 3 is a fragmentary perspective view illustrating a plurality of vane structures of a first row vane assembly including vane seal structures of seal systems according to embodiments of the invention;

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
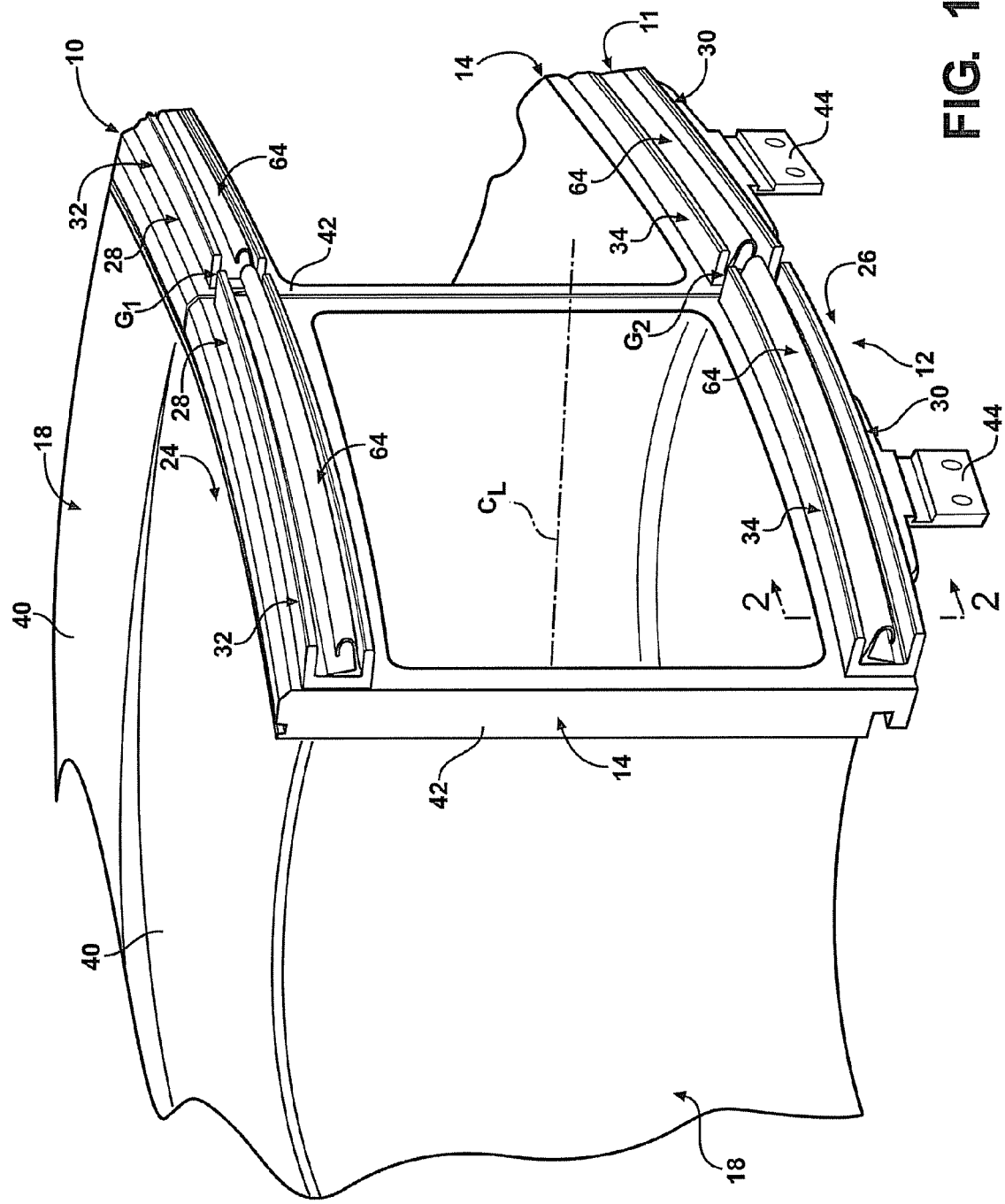
FIG. 1 is a fragmentary perspective view illustrating a plurality of transition ducts including transition seal structures of seal systems according to embodiments of the invention.

Referring to FIG. 1, portions of a radially inner seal system 10 and portions of a radially outer seal system 11 according to embodiments of the invention are shown. The seal systems 10, 11 are adapted for use in a gas turbine engine between a transition exit section 12 defined by a plurality of transition duct exits 14 and a first row vane assembly 15 (see FIG. 3) located proximate to a turbine inlet 16. Working gases are routed from combustors (not shown) to the turbine inlet 16 through a plurality of transition ducts 18, each transition duct 18 having an associated exit 14. The working gases expand in a turbine section 20 (FIG. 3) commencing at the turbine inlet 16 and cause blades (not shown) coupled to a shaft and disc assembly (not shown) to rotate. It is noted that not all of the transition ducts 18 that would typically be employed in an engine are shown in FIG. 1. That is, in a given engine, an annular array of transition ducts 18 would typically be employed, such that the transition exit section 12 would be defined by a substantially continuous ring of circumferentially adjacent transition duct exits 14. However, since the other transition ducts 18 employed in the engine would be substantially similar to those illustrated in FIG. 1, only a select few of the transition ducts 18 are illustrated in FIG. 1 for clarity.

The seal systems 10, 11 comprise annular seal systems 10, 11 that are located between the transition duct exits 14 and the first row vane assembly 15. The seal systems 10, 11 limit leakages of fluids between a hot gas path 22 (see FIG. 3) that passes through the turbine section 20 and respective radially inner and outer areas 24, 26 (see FIGS. 1 and 3) that contain cooling fluid for cooling structure to be cooled within the engine. That is, the seal systems 10, 11 limit leakage of the hot working gases in the hot gas path 22 into each of the areas 24, 26, and also limit leakage of the cooling fluid in the areas 24, 26 into the hot gas path 22.

Referring to FIGS. 1 and 3, the radially inner seal system 10 comprises a plurality of circumferentially adjacent radially inner seal apparatuses 28 and the radially outer seal system 11 comprises a plurality of circumferentially adjacent radially outer seal apparatuses 30. Each seal apparatus 28, 30 includes one or more transition seal structures 32, 34 (FIG. 1), respectively, which transition seal structures 32, 34 are associated with the transition duct exits 14. Each seal apparatus 28, 30 further includes one or more vane seal structures 36, 38 (see FIG. 3), respectively, which vane seal structures 36, 38 are associated with the first row vane assembly 15, as will be described herein. The seal apparatuses 28, 30 are located between the transition duct exits 14 and the first row vane assembly 15 to collectively form the respective seal systems 10, 11.

Each of the transition ducts 18 is associated with one or more of each of the transition seal structures 32, 34, and, in the embodiment shown, each of the transition ducts 18 is associated with one of the transition seal structures 32 and one of the transition seal structures 34. It is noted that the transition ducts 18 and their associated transition seal structures 32, 34 are substantially similar to each other. Further, the transition seal structures 32, 34 are substantial mirror images of one another, i.e., about a centerline $C_L$ of each of the transition ducts 18, with the exception of the transition seal structures 34 having a greater circumferential length than the transition seal structures 32, which greater circumferential length results from the radially outer seal system 11 having a greater overall diameter than the radially inner seal system 10. Hence, only a single transition duct 18 (see FIG. 2) and its associated transition seal structure 34 (see FIG. 2) will be described in detail herein. It is understood that the other transition ducts 18 and their associated transition seal structures 32, 34 may be constructed in the same manner as the transition duct 18 and its transition seal structure 34 described herein, with the transition seal structures 32 being mirrored horizontally about the respective centerline $C_L$ from the described transition seal structure 34.

The transition duct 18 in the embodiment shown comprises a substantially tubular duct panel structure 40 and an associated transition exit flange 42. The duct panel structure 40 is coupled, via bracket structure 44, to structure (not shown) affixed to a compressor exit casing (not shown), and defines a flow path for the hot working gases passing from an associated combustor into the turbine section 20. The transition exit flange 42 extends about an opening defined by an outlet end of the duct panel structure 40 and defines the exit 14 of the transition duct 18.

Figure 2:
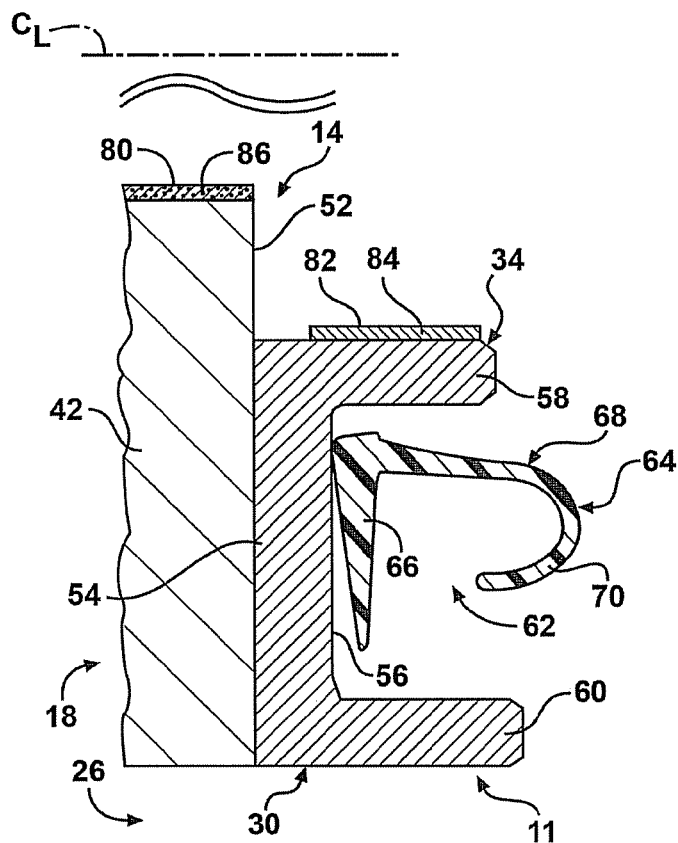
FIG. 2 is a cross sectional view taken along line 2-2 in FIG. 1, illustrating a portion of one of the transition ducts illustrated in FIG. 1 and its corresponding transition seal structure.

In the embodiment shown in FIG. 2, the transition seal structure 34 is affixed to an axially facing surface 52 of the exit flange 42. Any suitable method that produces a coupling capable of functioning in the high temperature environment of the transition exit/turbine inlet may be used to couple the transition seal structure 34 to the exit flange 42, such as, for example, using an affixation structure, such as a bolt or pin, welding, etc. It is noted that the exit flange 42 and the transition seal structure 34 could be integrally formed as a single structure without departing from the spirit and scope of the invention.

The transition seal structure 34 comprises a transition base portion 54 associated with the transition duct 18, i.e., mounted to the axially facing surface 52 of the transition exit flange 42, see FIG. 2. The transition base portion 54 defines a first axially facing surface 56 of the transition seal structure 34. The transition seal structure 34 further comprises a first transition lip member 58, i.e., a radially inner transition lip member, which extends axially from the first axially facing surface 56 of the transition base portion 54. The transition seal structure 34 further comprises a second transition lip member 60, i.e., a radially outer transition lip member, which is radially spaced from the first transition lip member 58 and extends axially from the first axially facing surface 56 of the transition base portion 54.

A transition channel 62 is located between the first transition lip member 58, the second transition lip member 60, and the transition base portion 54. In the embodiment shown in FIG. 2, a seal member 64 is disposed in the transition channel 62 for limiting a leakage of fluids through the seal apparatus 30.

In the embodiment shown, the seal member 64 comprises a rigid portion 66 that engages the first axially facing surface 56 of the transition base portion 54, and a flexible portion 68 that extends axially from the rigid portion 66. The flexible portion 68 may include a hook shaped or curved portion 70, as shown in FIG. 2. The curved portion 70 is adapted to engage a corresponding vane seal structure 38 associated with the first row vane assembly 15, as will be discussed in detail herein.

The seal member 64 according to this embodiment may be situated in one of at least two positions. That is, the seal member 64 may situated in a first position, illustrated in FIG.

2, wherein the rigid portion 66 contacts the first axially facing surface 56 of the transition base portion 54 at less than a full extent of the rigid portion 66, i.e., the rigid portion 66 is disposed at an angle with respect to the first axially facing surface 56 of the transition base portion 54. Further, the seal member 64 may be situated in a second, rotated position, illustrated in FIG. 5, as will be discussed in detail herein.

As shown in FIG. 2, the transition duct 18 comprises a first radially facing surface 80 that faces the centerline $C_L$ of the transition duct 18. The first radially facing surface 80 is exposed to the hot working gases flowing through the transition duct 18 on their way into the turbine section 20. The transition seal structure 34, i.e., the first transition lip member 58 thereof, comprises a second radially facing surface 82 that faces the centerline $C_L$ of the transition duct 18, and is located radially further from the centerline $C_L$ of the transition duct 18 than is the first radially facing surface 80 of the transition duct 18.

As shown in FIG. 2, the second radially facing surface 82 may comprise an abradable coating 84, which abradable coating 84 may comprise a sacrificial layer in the case of contact between the second radially facing surface 82 and a corresponding vane seal structure 38, as will be discussed below, thus further increasing a lifespan of the transition seal structure 34. Further, the first radially facing surface 80 of the transition duct 18 may comprise a thermal barrier coating (TBC) 86, which thermal barrier coating 86 may be more tolerant to the high temperatures of the hot working gases exiting the transition duct 18 than the material forming the transition duct 18, thus increasing a lifespan of the transition duct 18.

Referring now to FIG. 3, a plurality of vane structures 100 of the first row vane assembly 15 are shown. Each of the vane structures 100 is associated with one or more of each of the vane seal structures 36, 38, and, in the embodiment shown, each vane structure 100 is associated with one of the vane seal structures 36 and with one of the vane seal structures 38. The vane seal structures 36, 38 associated with the vane structures 100 cooperate with respective ones of the transition seal structures 32, 34 associated with the transition ducts 18 to form the seal apparatuses 28, 30 of the seal systems 10, 11.

It is noted that the vane structures 100 and their associated vane seal structures 36, 38 are substantially similar to one another. Further, the vane seal structures 36, 38 are substantial mirror images of one another, i.e., about the centerline $C_L$ of the transition ducts 18. Hence, only a single vane structure 100 (see FIG. 4) and its associated vane seal structure 38 (see FIG. 4) will be described in detail herein. It is understood that the other vane structures 100 and their associated vane seal structures 36, 38 may be constructed in the same manner as the vane structure 100 and its radially outer vane seal structure 38 described herein, with the vane seal structures 36 being mirrored horizontally about the centerline $C_L$ from the described vane seal structure 38.

The vane structures 100 in the embodiment shown in FIG. 3 comprise a vane member 102 and associated radially inner and radially outer vane flanges 104, 106. The vane structures 100 are coupled to an engine casing via mounting hardware (not shown).

Figure 4:
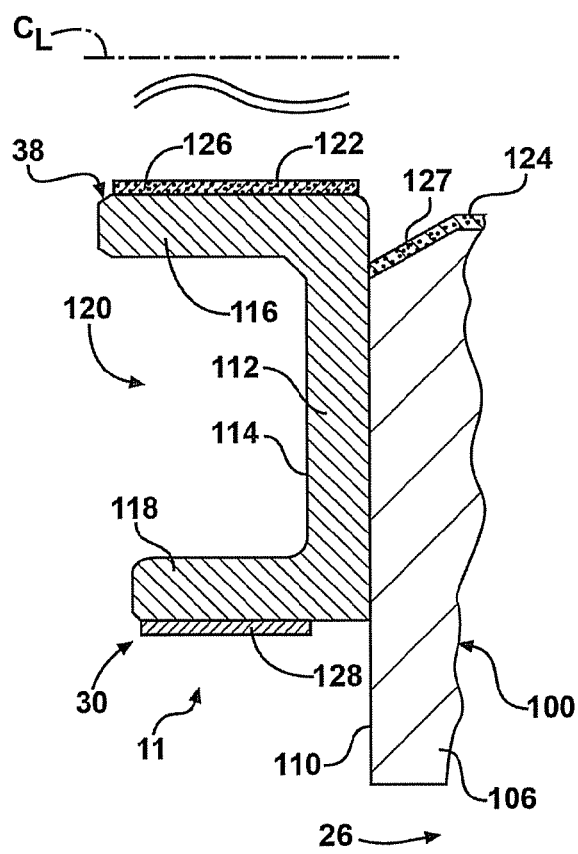
FIG. 4 is a cross sectional view taken along line 4-4 in FIG. 3, illustrating a portion of one the vane structures illustrated in FIG. 3 and its corresponding vane seal structure.

In the embodiment shown in FIG. 4, the vane seal structure 38 is affixed to an axially facing surface 110 of the radially outer vane flange 106. Any suitable method that produces a coupling capable of functioning in the high temperature environment of the transition exit/turbine inlet may be used to couple the vane seal structure 38 to the vane flange 106, such as, for example, using an affixation structure, such as a bolt or pin, welding, etc. It is noted that the vane flange 106 and the vane seal structure 38 could be integrally formed as a single structure without departing from the spirit and scope of the invention.

The vane seal structure 38 comprises a vane base portion 112 associated with the vane structure 100, i.e., mounted to the axially facing surface 110 of the vane flange 106. The vane base portion 112 defines a second axially facing surface 114 of the vane seal structure 38. The vane seal structure 38 further comprises a first vane lip member 116, i.e., a radially inner vane lip member, which extends axially from the second axially facing surface 114 of the vane base portion 112. The vane seal structure 38 further comprises a second vane lip member 118, i.e., a radially outer vane lip member, which is radially spaced from the first vane lip member 116 and extends axially from the second axially facing surface 114 of the vane base portion 112.

Figure 5:
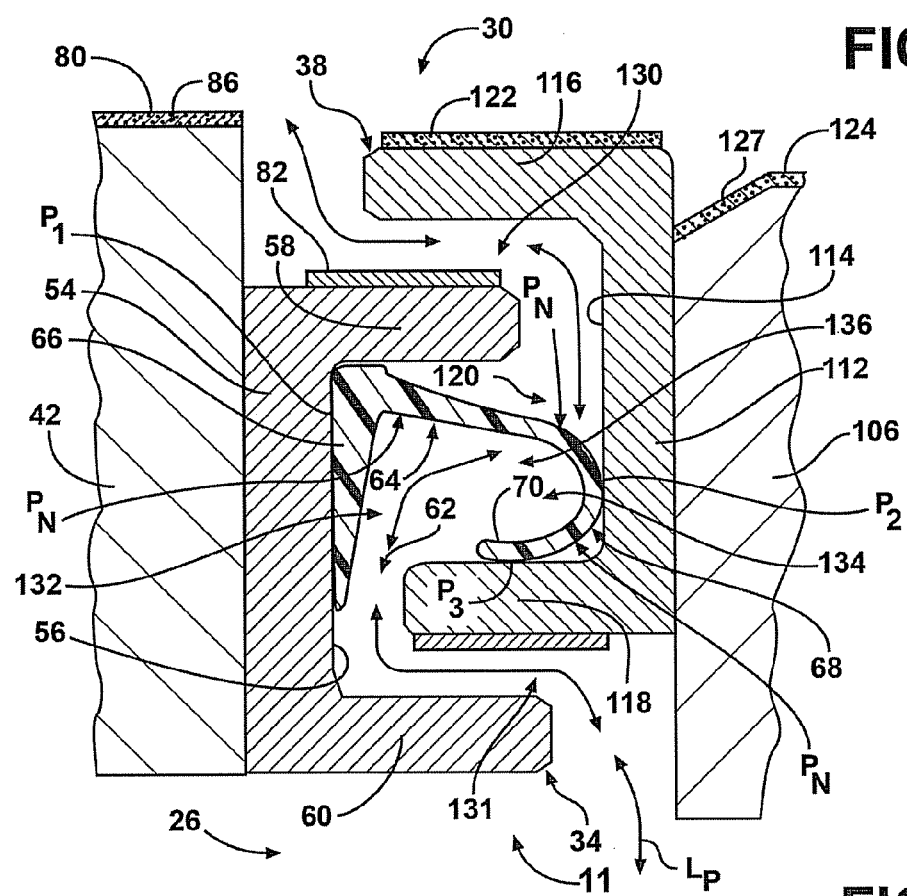
FIG. 5 is a cross sectional view of the transition seal structure illustrated in FIG. 2 cooperating with the vane seal structure illustrated in FIG. 4 to form a seal apparatus of a seal system according to an embodiment of the invention.

A vane channel 120 is located between the first vane lip member 116, the second vane lip member 118, and the vane base portion 112. Referring to FIG. 5, when the seal apparatus 30 is assembled, the seal member 64 is disposed in the transition channel 62 and in the vane channel 120 for limiting the leakage of fluids through the seal apparatus 30, as will be discussed in detail herein.

Referring back to FIG. 4, the vane seal structure 38, i.e., the first vane lip member 116 thereof, comprises a third radially facing surface 122 that faces the centerline $C_L$ of the transition duct 18. The vane structure 100 comprises a fourth radially facing surface 124 that faces the centerline $C_L$ of the transition duct 18. The fourth radially facing surface 124 of the vane structure 100 is located radially further from the centerline $C_L$ of the transition duct 18 than is the third radially facing surface 122 of the vane seal structure 38. Thus, the third and fourth radially facing surfaces 122, 124 create a "waterfall effect" for the hot working gases flowing into the turbine section 20, such that exposure of the fourth radially facing surface 124 to the hot working gases is reduced. The reduced exposure of the fourth radially facing surface 124 to the hot working gases may increase the lifespan of the vane structure 100. Further, the "waterfall effect" reduces impingement of the hot working gases flowing into the turbine section 20, since the vane structure 100 does not extend into/block the hot working gases flowing into the turbine section 20. It is noted that, since the vane seal structure 38 is directly affixed to the vane structure 100, relative radial movement between the vane seal structure 38 and the vane structure 100 does not occur. Thus, the fourth radially facing surface 124 of the vane structure 100 is prevented at all times from being located closer to the centerline $C_L$ of the transition duct 18 than the third radially facing surface 122 of the vane seal structure 38, which creates a positive "waterfall effect" between the third and fourth radially facing surface 122, 124 at all times during operation of the engine.

Moreover, as shown in FIG. 5, the third radially facing surface 122 of the vane seal structure 38 is located radially further from the centerline $C_L$ of the transition duct 18 than is the first radially facing surface 80 of the transition duct 18. Thus, the first and third radially facing surfaces 80, 122 create a "waterfall effect" for the hot working gases flowing into the turbine section 20, such that exposure of the third radially facing surface 122 to the hot working gases is reduced. Further, the "waterfall effect" reduces impingement of the hot working gases flowing into the turbine section 20, since the vane seal structure 38 does not extend into/block the hot working gases flowing out of the transition exit 14 and into the turbine section 20.

As shown in FIG. 4, the third radially facing surface 122 of the vane seal structure 38 may comprise a thermal barrier coating 126, which thermal barrier coating 126 may be more tolerant to the high temperatures of the hot working gases entering the turbine section 20 than the material forming the vane seal structure 38, thus increasing a lifespan of the vane seal structure 38. Additionally, the fourth radially facing surface 124 of the vane structure 100 may comprise a thermal barrier coating 127, which thermal barrier coating 127 may be more tolerant to the high temperatures of the hot working gases entering the turbine section 20 than the material forming the vane structure 100, thus increasing a lifespan of the vane structure 100. Further, the second vane lip member 118 may comprise an abradable coating 128 in the case of contact between the second vane lip member 118 and the second transition lip member 60 (FIG. 5). The abradable coating 128 may comprise a sacrificial layer so as to prevent damage to the lip members 60, 118.

As noted above, the additional transition seal structures 32, 34 and the additional vane seal structures 36, 38 may be constructed in the same manner as the described transition seal structure 34 and vane seal structure 38. However, also noted above, the transition seal structures 32 and the vane seal structures 36 may be mirror images of the transition seal structure 34 and the vane seal structure 38 described in detail herein. For example, the seal members 64 disposed between the transition seal structures 32 and the vane seal structures 36 may be oriented in the opposite direction than that described for the transition seal structure 34 and the vane seal structure 38.

Referring back to FIG. 1, first gaps $G_1$ are formed between circumferentially adjacent transition seal structures 32. The first gaps $G_1$ permit the transition ducts 18 and transition seal structures 32 to thermally expand, which thermal expansion may occur during operation of the engine, without contact between adjacent transition seal structures 32. Further, second gaps $G_2$, which may be circumferentially aligned with the first gaps $G_1$, are formed between circumferentially adjacent transition seal structures 34. The second gaps $G_2$ permit the transition ducts 18 and transition seal structures 34 to thermally expand, which thermal expansion may occur during operation of the engine, without contact between adjacent transition seal structures 34.

Referring to FIG. 3, third gaps $G_3$ are formed between circumferentially adjacent vane seal structures 36. The third gaps $G_3$ permit the vane structures 100 and vane seal structures 36 to thermally expand, which thermal expansion may occur during operation of the engine, without contact between adjacent vane seal structures 36. Further, fourth gaps $G_4$, which may be circumferentially aligned with the third gaps $G_3$, are formed between circumferentially adjacent vane seal structures 38. The fourth gaps $G_4$ permit the vane structures 100 and vane seal structures 38 to thermally expand, which thermal expansion may occur during operation of the engine, without contact between adjacent vane seal structures 38.

It is noted that, in a preferred embodiment, the gaps $G_1$, $G_2$ do not circumferentially align with the gaps $G_3$, $G_4$, such that direct flow paths though the respective gaps $G_1$, $G_3$, and $G_2$, $G_4$ are not formed. Further, as shown in FIG. 3, sealing members 129, such as, for example, dog bone seals, may span between circumferentially adjacent vane seal structures 36, 38 to block the gaps $G_3$, $G_4$ and thus limit leakage through the seal systems 10, 11.

Figure 6:
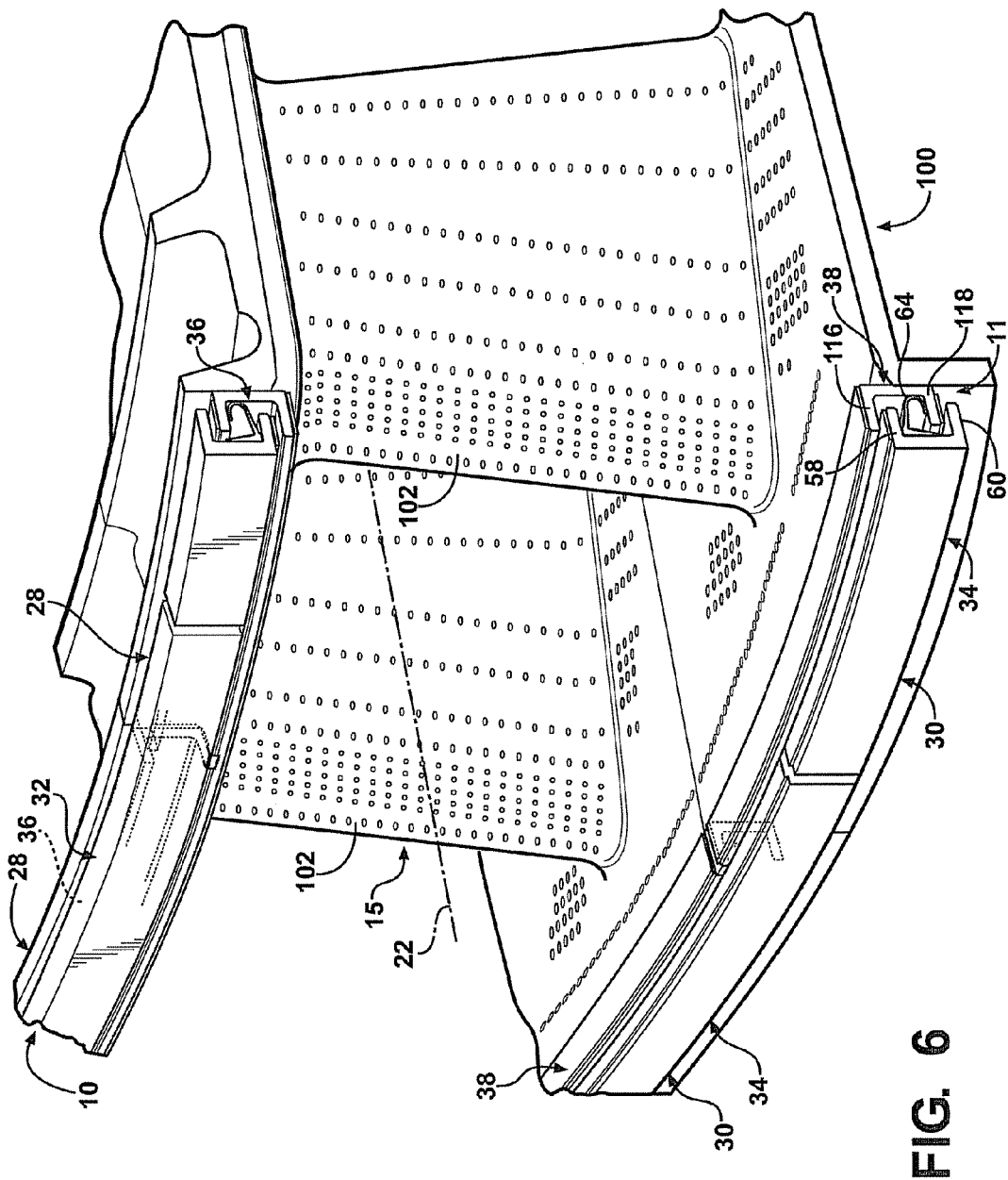
FIG. 6 is a fragmentary perspective view of a plurality of the transition seal structures illustrated in FIG. 1, shown removed from their corresponding transition ducts, cooperating with a plurality of the vane seal structures illustrated in FIG. 3 to form seal apparatuses of seal systems according to embodiments of the invention.

Referring now to FIGS. 5 and 6, the seal apparatuses 30 (one shown in FIG. 5) formed by the transition seal structures 34 and the vane seal structures 38 described herein with reference to FIGS. 1-4 are shown. It is noted that, in FIG. 6, the transition ducts 18 associated with the transition seal structures 34 have been removed for clarity. The seal apparatus 30 according to this embodiment is assembled by an axial installation of at least one of the first row vane assembly 15 and the transition duct 18 in a direction toward one another until the vane seal structure 38 and the transition seal structure 34 reach a desired position with respect to one another. This axial installation results in the formation of the illustrated seal apparatus 30 (and the formation of the other seal apparatuses 28, 30), i.e., by the bringing together of the transition seal structure 34 and the vane seal structure 38 such that the transition lip members 58, 60 axially overlap the vane lip members 116, 118.

During the axial installation, the seal member 64 is caused to be rotated into a desired position. That is, before assembly of the seal apparatus 30, the seal member 64 may be situated in its first position, as discussed above and shown in FIG. 2. Upon the axial assembly of the seal apparatus 30, the second axially facing surface 114 of the vane base portion 112 contacts the flexible portion 68 of the seal member 64, and continued axial movement of the transition seal structure 34 and the vane seal structure 38 toward one another causes the seal member 64 to be rotated into its second position, as shown in FIG. 5. While in its second position, the angle between the rigid portion 66 of the seal member 64 and the first axially facing surface 56 of the transition base portion 54 may be substantially equal to zero (or at least less than the angle between the rigid portion 66 of the seal member 64 and the first axially facing surface 56 of the transition base portion 54 while the seal member 64 is in its first position). It is noted that, prior to installation, the seal member 64 according to this embodiment need not be disposed within the transition channel 62. For example, the seal member 64 may be disposed in the vane channel 120 and then rotated into position upon the axial installation of the seal apparatus 30.

When in the second, rotated position, the seal member 64 comprises at least three contact points with the seal apparatus 30, as shown in FIG. 5. That is, the rigid portion 66 of the seal member 64 contacts the first axially facing surface 56 of the transition base portion 54 at a first contact point $P_1$, the curved portion 70 of the seal member 64 contacts the second axially facing surface 114 of the vane base portion 112 at a second contact point $P_2$, and the curved portion 70 of the seal member 64 contacts the second vane lip 118 at a third contact point $P_3$. As shown in FIG. 5, the contact points $P_1$, $P_2$, $P_3$ are separated from each other by points of non-contact $P_N$.

Once installed, the first transition lip member 58 overlaps the first vane lip member 116 in the axial direction, and the second transition lip member 60 overlaps the second vane lip member 118 in the axial direction, as shown in FIGS. 5 and 6. Thus, the overlapping lip members 58, 116 and 60, 118, in combination with the transition channel 62 and the vane channel 120, form a labyrinth path $L_P$ (see FIG. 5) for fluids passing through the seal apparatus 30, thus reducing leakage through the seal apparatus 30 and the corresponding seal system 11.

Further, in the embodiment shown in FIG. 5, the first transition lip member 58 is received in the vane channel 120, thus creating a first vane passage 130 defined by the vane channel 120 between the first transition lip member 58 and the first vane lip member 116. Additionally, the second vane lip member 118 is received in the transition channel 62, thus creating a first transition passage 131 defined by the transition channel 62 between second transition lip member 60 and the second vane lip member 118. The first vane passage 130 and the first transition passage 131 further define the labyrinth path $L_P$. Moreover, a portion 132 of the transition channel 62 that does not include the first transition passage 131 and a portion 134 of the vane channel 120 that does not include the first vane passage 130 cooperate to define a common channel 136 that further defines the labyrinth path $L_P$.

The seal member 64 further reduces leakage through the seal apparatus 30 and the corresponding seal system 11 as a result of the contact points $P_1$, $P_2$, $P_3$ with the seal apparatus 30. It is noted that the invention could be practiced without the seal member 64, in which case the reduction of leakage through the seal system 11 could be facilitated by the labyrinth path $L_P$ without the seal member 64.

The seal systems 10, 11 described herein limit leakage between the hot gas path 22 and the areas 24, 26, which, as noted above contain cooling fluid for structure within the engine to be cooled. For example, since the lip members 58, 60 of the transition seal structures 32, 34 axially overlap the lip members 116, 118 of the vane seal structures 36, 38, the labyrinth path $L_P$ is formed to minimize leakage. Additionally, since the seal member 64 is captured between the lip members 58, 60 and 116, 118, leakage is further reduced. It is noted that, due to the location of the seal member 64, i.e., between the lip members 58, 60 and 116, 118, any damage/breakage of the seal member 64 resulting in pieces of the seal member 64 being introduced into the turbine section 20 is believed to be reduced. The reduction of pieces of the seal member 64 being introduced into the turbine section 20 is believed to increase a lifespan of the engine, as broken off pieces of the seal member 64 could cause damage to the structure in the turbine section 20.

Referring now to FIGS. 7-12, seal apparatuses in accordance with other embodiments of the invention are shown. As the transition ducts and vane structures associated with these seal apparatuses are substantially the same as the transition duct 18 and vane structure 100 described above with reference to FIGS. 1-6, the transition ducts and vane structures will not be described in the embodiments corresponding to FIGS. 7-12. Further, structure of the seal apparatuses of FIGS. 7-12 that is substantially the same as that described above with reference to FIGS. 1-6 will not be described for the embodiments of FIGS. 7-12. Only the differences between the seal apparatuses will be described. In FIGS. 7-12, structure specifically illustrated and described that corresponds to structure disclosed above with reference to FIGS. 1-6 will have the same reference number followed by a lowercase letter corresponding to the figure being described, i.e., "a" for FIG. 7, "b" for FIG. 8, "c" for FIG. 9, "d" for FIG. 10, "e" for FIG. 11, and "f" for FIG. 12.

Figure 7:
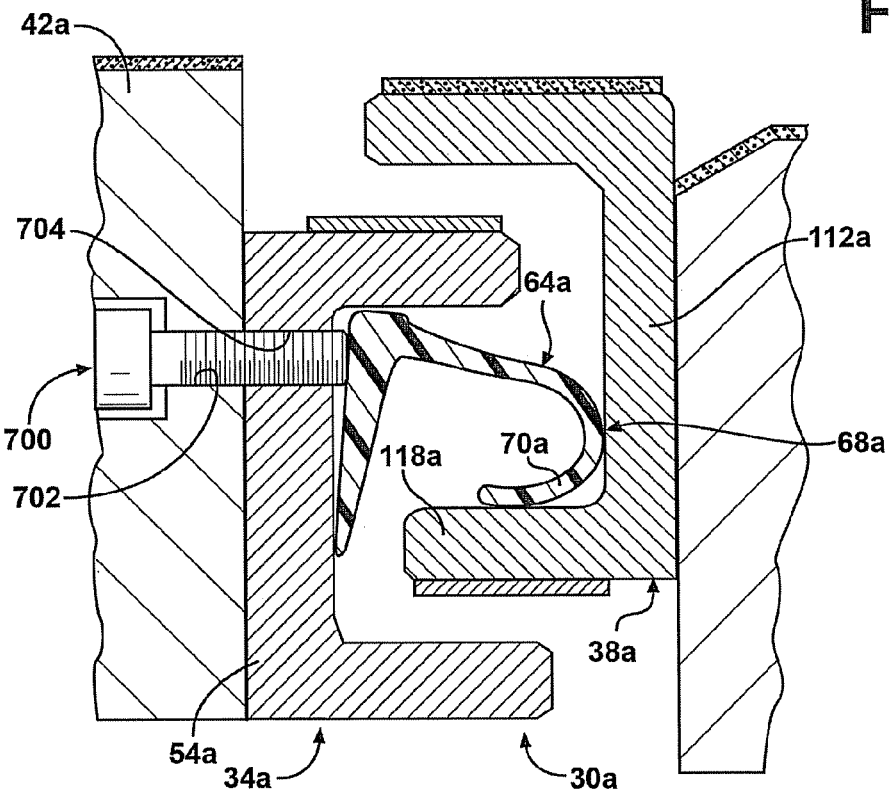
FIGS. 7-12 are cross sectional views of seal apparatuses of seal systems according to other embodiments of the invention.

Referring to FIG. 7, a seal member 64a according to this embodiment is situated into a desired position using a contact load 700, such as a screw, that is installed through an aperture 702, such as a threaded aperture, formed in a transition exit flange 42a and through a corresponding aperture 704 formed in a transition base portion 54a of a transition seal structure 34a. To position the seal member 64a into its desired (rotated) position, the contact load 700 is manipulated, e.g., by circumferential rotation of the contact load 700 in the embodiment shown to thread the contact load 700 through the apertures 702, 704, such that the contact load 700 axially pushes the seal member 64a until a flexible portion 68a of the seal member 64a contacts a vane base portion 112a of a vane seal structure 38a. The seal member 64a is axially pushed by the contact load 700 into the vane base portion 112a until a curved portion 70a of the seal member 64a contacts a second vane lip member 118a of the vane seal structure 38a, thus providing three total points of contact between the seal member 64a and a seal apparatus 30a that includes the transition seal structure 34a and the vane seal structure 38a.

Figure 8:
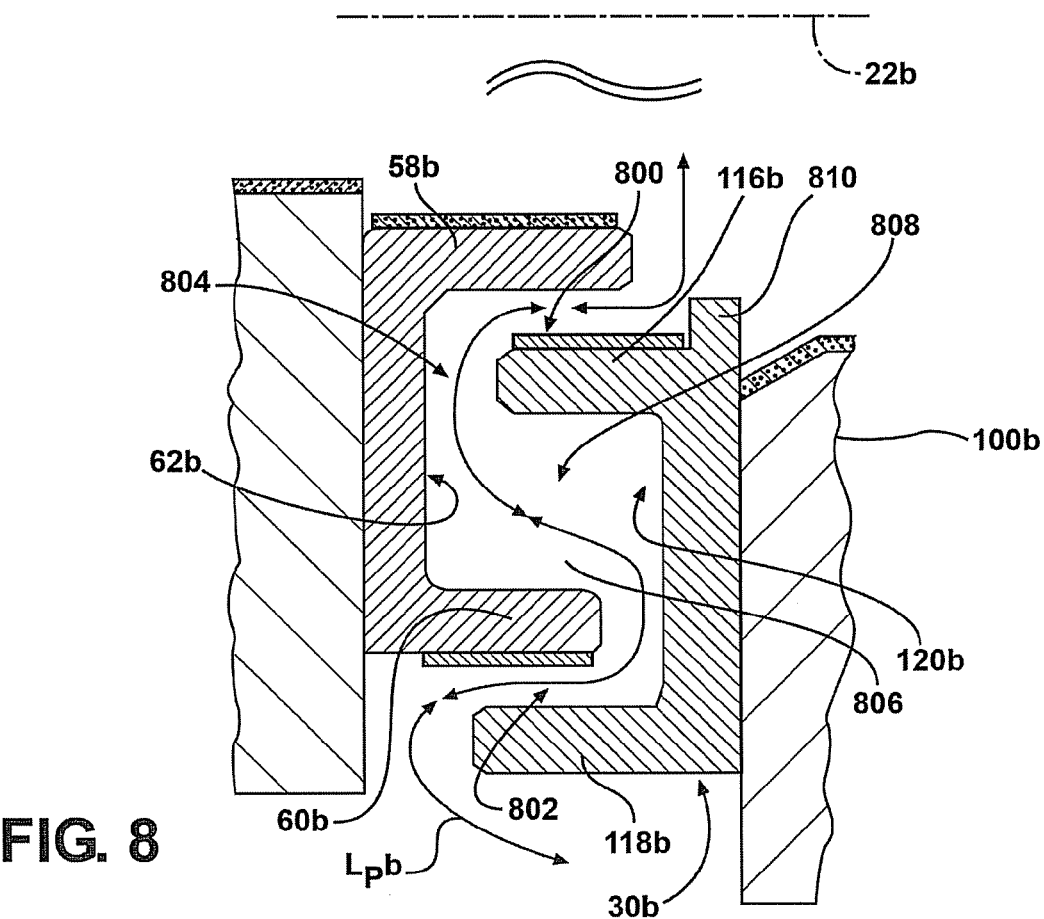

Referring to FIG. 8, a seal apparatus 30b is shown that does not include a seal member, i.e., does not include the seal member 64 described above with reference to FIGS. 1-6. The axial overlapping of transition lip members 58b, 60b and vane lip members 116b, 118b according to this embodiment creates a labyrinth path $L_P b$ to limit leakage through the seal apparatus 30b.

Further, in this embodiment, the first vane lip member 116b is received in a transition channel 62b, thus creating a first transition passage 800 defined by the transition channel 62b between the first transition lip member 58b and the first vane lip member 116b. Additionally, the second transition lip member 60b is received in a vane channel 120b, thus creating a first vane passage 802 defined by the vane channel 120b between the second transition lip member 60b and the second vane lip member 118b. The first transition passage 800 and the first vane passage 802 further define the labyrinth path $L_P b$. Moreover, a portion 804 of the transition channel 62b that does not include the first transition passage portion 800 and a portion 806 of the vane channel 120b that does not include the first vane passage 802 cooperate to define a common channel 808 that further defines the labyrinth path $L_P b$. Still further, a rim member 810 of a vane seal structure 30b according to this embodiment extends from the first vane lip member 116b toward a hot gas path 22b to shield a vane structure 100b from hot working gases in the hot gas path 22b. In a preferred embodiment, the rim member 810 may extend radially toward the hot gas path 22b further than the vane structure 100b.

Figure 9:
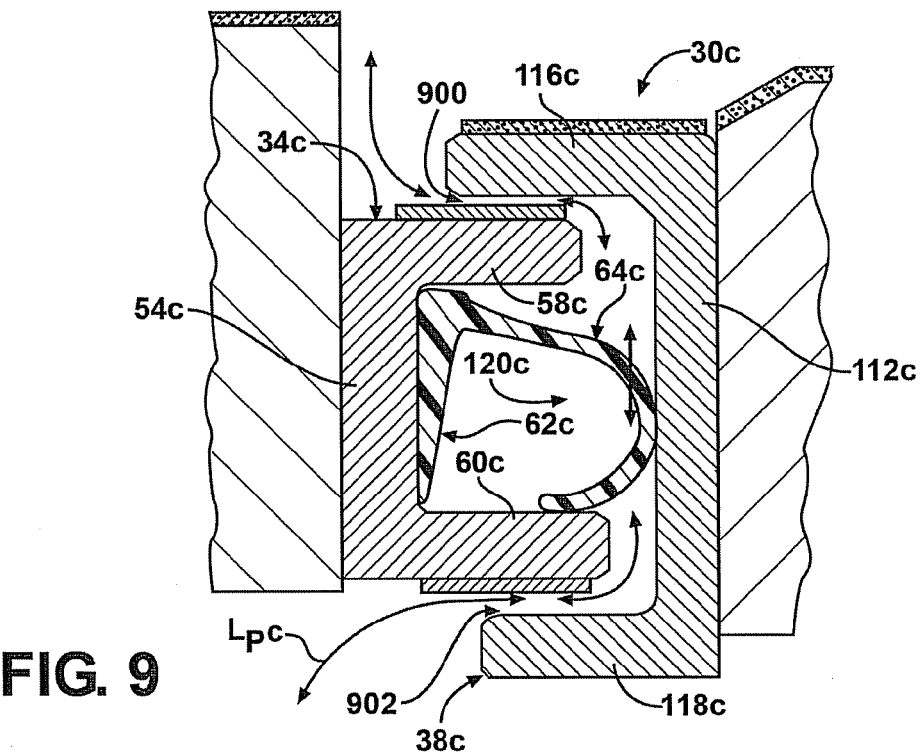

Referring to FIG. 9, both transition lip members 58c, 60c of a transition seal structure 34c are received in a vane channel 120c formed by a pair of vane lip members 116c, 118c and a vane base portion 112c of a vane seal structure 38c. A seal member 64c is received in a transition channel 62c formed between the transition lip members 58c, 60c and a transition base portion 54c of the transition seal structure 34c. In this embodiment, the vane channel 120c defines a first vane passage 900 between the first vane lip member 116c and the first transition lip member 58c and the vane channel 120c defines a second vane passage 902 between the second vane lip member 118c and the second transition lip member 60c. The first and second vane passages 900, 902 at least partially define a labyrinth path $L_P c$ through a seal apparatus 30c that comprises the transition seal structure 34c, the vane seal structure 38c, and the seal member 64c.

Figure 10:
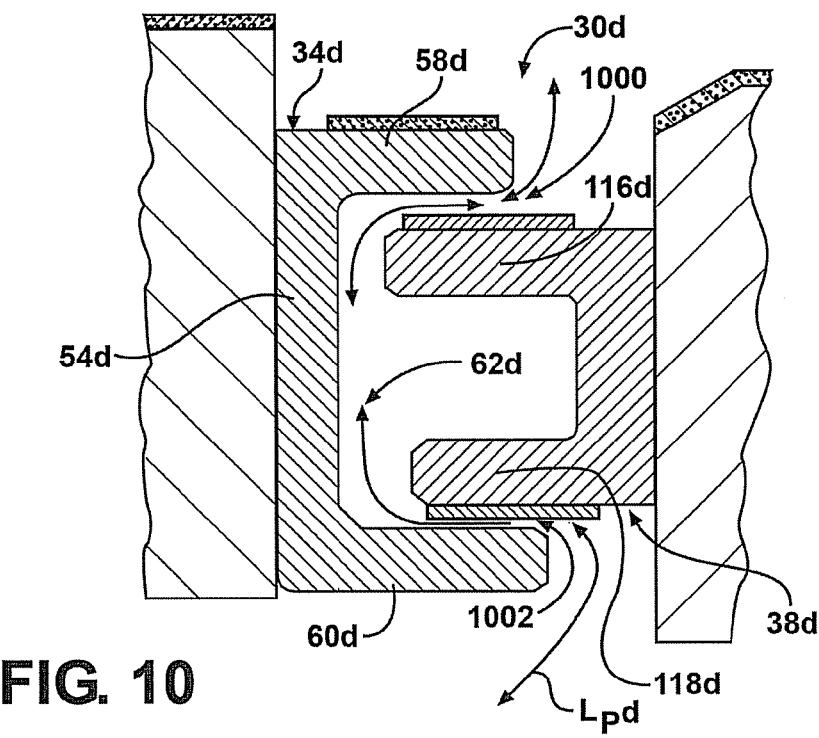

Referring to FIG. 10, both vane lip members 116d, 118d of a vane seal structure 38d are received in a transition channel 62d formed by a pair of transition lip members 58d, 60d and a transition base portion 54d of a transition seal structure 34d. In this embodiment, the transition channel 62d defines a first transition passage 1000 between the first transition lip member 58d and the first vane lip member 116d and the transition channel 62d defines a second transition passage 1002 between the second transition lip member 60d and the second vane lip member 118d. The first and second transition passages 1000, 1002 at least partially define a labyrinth path $L_P d$ through a seal apparatus 30d that comprises the transition seal structure 34d and the vane seal structure 38d, and, in this embodiment, does not include a seal member, such as the seal member 64 as described above with reference to FIGS. 1-6.

Figure 11:
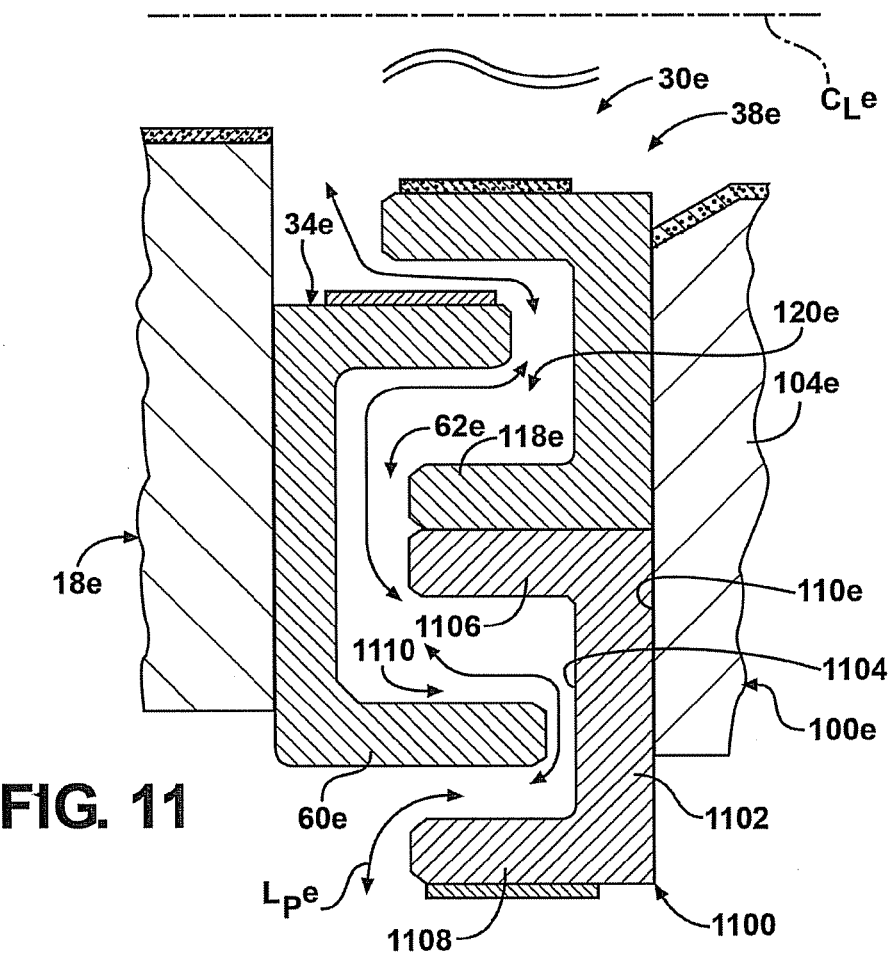

Referring to FIG. 11, a seal apparatus 30e according to this embodiment includes a transition seal structure 34e, a vane seal structure 38e, and an auxiliary seal structure 1100. The auxiliary seal structure 1100 according to this embodiment is associated with a vane structure 100e, and is located adjacent to the vane seal structure 38e on the opposite side of the vane seal structure 38e from a centerline $C_Le$ of a transition duct 18e.

In the embodiment shown in FIG. 11, the auxiliary seal structure 1100 is affixed to an axially facing surface 110e of a radially inner vane flange 104e of the vane structure 100e. Any suitable method of producing a coupling capable of functioning in a high temperature environment may be used to couple the auxiliary seal structure 1100 to the vane flange 104e, such as, for example, using an affixation structure, such as a bolt or pin, welding, etc. It is noted that, without departing from the spirit and scope of the invention, the vane flange 104e and the auxiliary seal structure 1100 could be integrally formed as a single structure, wherein the vane flange 104e may include a base portion and three axially extending lip members forming an "E" shaped structure.

The auxiliary seal structure 1100 comprises an auxiliary base portion 1102 associated with the vane structure 100e, i.e., mounted to the axially facing surface 110e of the vane flange 104e. The auxiliary base portion 1100 defines a third axially facing surface 1104 of the auxiliary seal structure 1100. The auxiliary seal structure 1100 further comprises a first auxiliary lip member 1106, i.e., a radially inner auxiliary lip member, which extends axially from the third axially facing surface 1104 of the auxiliary base portion 1102. The auxiliary seal structure 1100 further comprises a second auxiliary lip member 1108, i.e., a radially outer transition lip member, which is radially spaced from the first auxiliary lip member 1106 and extends axially from the third axially facing surface 1104 of the auxiliary base portion 1102. As shown in FIG. 11, the first auxiliary lip member 1106 abuts a second vane lip member 118e of the vane seal structure 38e, and, along with the second vane lip member 118e, is received in a transition channel 62e formed by the transition seal structure 34e.

An auxiliary channel 1110 is located between the first auxiliary lip member 1106, the second auxiliary lip member 1108, and the auxiliary base portion 1102. As shown in FIG. 11, a second transition lip member 60e of the transition seal structure 34e is received in the auxiliary channel 1100.

A labyrinth path $L_Pe$ according to this embodiment is formed by the transition channel 62e, a vane channel 120e, and the auxiliary channel 1110.

Figure 12:
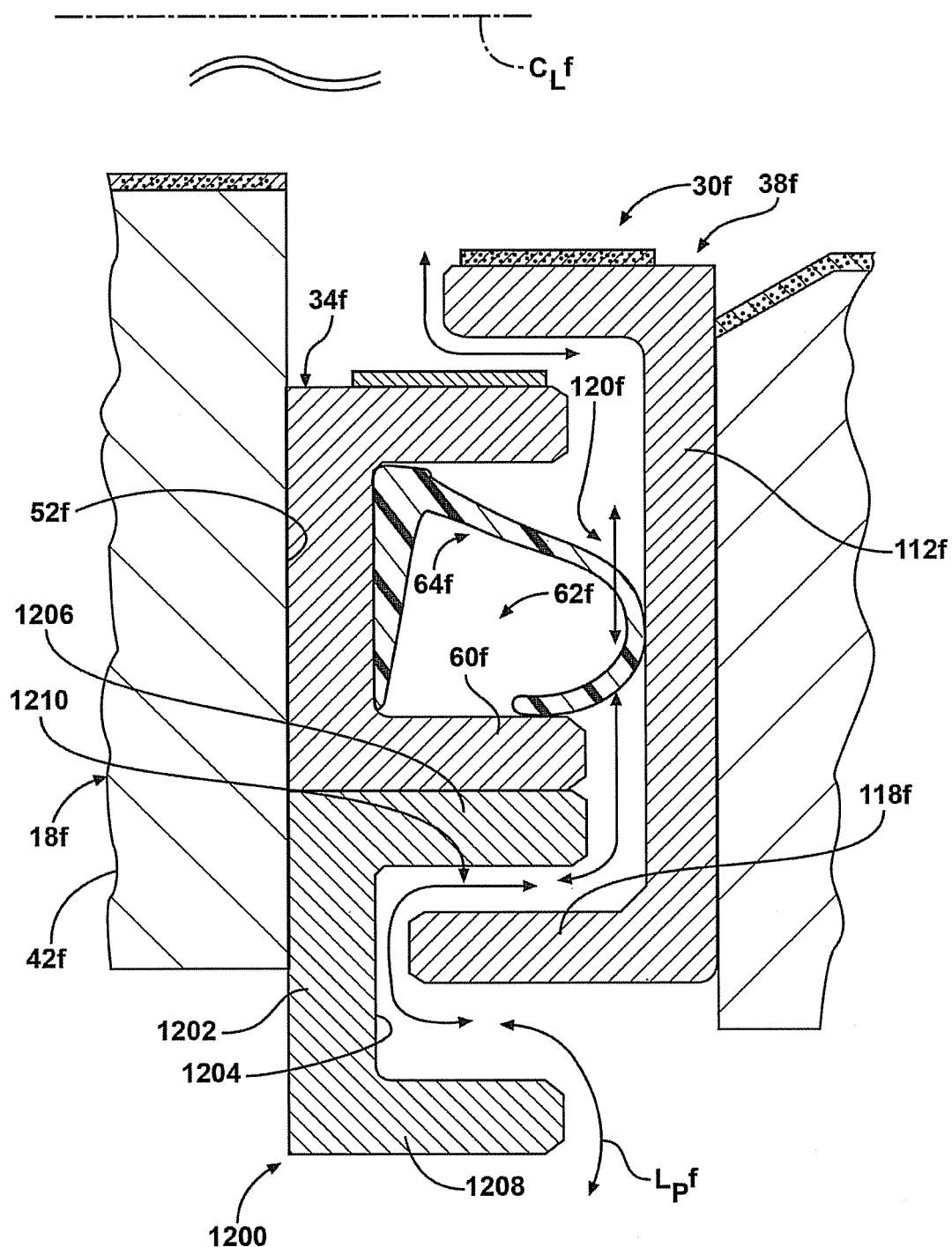

Referring to FIG. 12, a seal apparatus 30f according to this embodiment includes a transition seal structure 34f, a vane seal structure 38f, an auxiliary seal structure 1200, and a seal member 64f. The auxiliary seal structure 1200 according to this embodiment is associated with a transition duct 18f, and is located adjacent to the transition seal structure 34f on the opposite side of the transition seal structure 34f from a centerline $C_Lf$ of the transition duct 18f.

In the embodiment shown in FIG. 12, the auxiliary seal structure 1200 is affixed to an axially facing surface 52f of a transition exit flange 42f of the transition duct 18f. Any suitable method of producing a coupling capable of functioning in a high temperature environment may be used to couple the auxiliary seal structure 1200 to the transition exit flange 42f, such as, for example, using an affixation structure, such as a bolt or pin, welding, etc. It is noted that the transition exit flange 42f and the auxiliary seal structure 1200 could be integrally formed as a single structure without departing from the spirit and scope of the invention.

The auxiliary seal structure 1200 comprises an auxiliary base portion 1202 associated with the transition duct 18f, i.e., mounted to the axially facing surface 52f of the transition exit flange 42f. The auxiliary base portion 1200 defines a third axially facing surface 1204 of the auxiliary seal structure 1200. The auxiliary seal structure 1200 further comprises a first auxiliary lip member 1206, i.e., a radially inner auxiliary lip member, which extends axially from the third axially facing surface 1204 of the auxiliary base portion 1202. The auxiliary seal structure 1200 further comprises a second auxiliary lip member 1208, i.e., a radially outer transition lip member, which is radially spaced from the first auxiliary lip member 1206 and extends axially from the third axially facing surface 1204 of the auxiliary base portion 1202. As shown in FIG. 12, the first auxiliary lip member 1206 abuts a second transition lip member 60f of the transition seal structure 34f, and, along with the second transition lip member 60f, is received in a vane channel 120f formed by the vane seal structure 38f.

An auxiliary channel 1210 is located between the first auxiliary lip member 1206, the second auxiliary lip member 1208, and the auxiliary base portion 1202. As shown in FIG. 12, a second vane lip member 118f of the vane seal structure 38f is received in the auxiliary channel 1210.

A labyrinth path $L_Pf$ according to this embodiment is formed by the vane channel 120f, a transition channel 62f, and the auxiliary channel 1210.

Further, the seal member 64f is located in the transition channel 62f and in contact with a base portion 112f of the vane seal structure 38f to restrict flow between the vane channel 120f and the auxiliary channel 1210.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A seal apparatus in a gas turbine engine between a transition duct and a vane structure in a first row vane assembly, said seal apparatus comprising:
   a transition seal structure associated with the transition duct, said transition seal structure comprising:
      a transition base portion associated with the transition duct and defining a first axially facing surface;
      a first transition lip member extending axially from said first axially facing surface of said transition base portion; and
      a second transition lip member radially spaced from said first transition lip member and extending axially from said first axially facing surface of said transition base portion such that a transition channel is located between said first transition lip member, said second transition lip member, and said transition base portion;
   a vane seal structure associated with the vane structure, said vane seal structure comprising:
      a vane base portion associated with the vane structure and defining a second axially facing surface;
      a first vane lip member extending axially from said second axially facing surface of said vane base portion; and
      a second vane lip member radially spaced from said first vane lip member and extending axially from said second axially facing surface of said vane base portion such that a vane channel is located between said first vane lip member, said second vane lip member, and said vane base portion;
   wherein said first transition lip member overlaps said first vane lip member in an axial direction and said second transition lip member overlaps said second vane lip member in the axial direction;
wherein one of:
a transition lip member is received in said vane channel; and
a vane lip member is received in said transition channel; and
wherein said transition channel and said vane channel define a labyrinth path for fluids passing through the seal apparatus.

2. The seal apparatus of claim 1, further comprising a seal member located in at least one of said transition channel and said vane channel, said seal member limiting a leakage of fluids through the seal apparatus.

3. The seal apparatus of claim 2, wherein said seal member comprises a flexible portion and a rigid portion and includes at least one point of contact with said transition seal structure and said seal member includes at least one point of contact with said vane seal structure.

4. The seal apparatus of claim 3, wherein said seal member comprises at least three total points of contact with said transition seal structure and said vane seal structure, said at least three total points of contact separated by points of non-contact, wherein at least one of said at least three total points of contact comprises contact with one of said lip members.

5. The seal apparatus of claim 1, wherein said vane seal structure includes a rim member that extends from said first vane lip member toward a hot gas path to shield the vane structure from hot working gases in the hot gas path.

6. The seal apparatus of claim 1, wherein the transition duct comprises a first radially facing surface that faces a centerline of the transition duct and said transition seal structure comprises a second radially facing surface that faces the centerline of the transition duct, said second radially facing surface of said transition seal structure located radially further from the centerline of the transition duct than said first radially facing surface of the transition duct.

7. The seal apparatus of claim 6, wherein said vane seal structure comprises a third radially facing surface that faces the centerline of the transition duct, said third radially facing surface of said vane seal structure located radially further from the duct.

8. The seal apparatus of claim 1, wherein one of:
both said first and second vane lip members are located in said transition channel; and
both said first and second transition lip members are located in said vane channel.

9. The seal apparatus of claim 8, wherein one of:
said transition channel defines a first transition passage between said first transition lip member and said first vane lip member and said transition channel defines a second transition passage between said second transition lip member and said second vane lip member, said first and second transition passages at least partially defining said labyrinth path; and
said vane channel defines a first vane passage between said first vane lip member and said first transition lip member and said vane channel defines a second vane passage between said second vane lip member and said second transition lip member, said first and second vane passages at least partially defining said labyrinth path.

10. The seal apparatus of claim 1, wherein one of:
said first vane lip member is received in said transition channel and said second transition lip member is received in said vane channel; and
said first transition lip member is received in said vane channel and said second vane lip member is received in said transition channel.

11. The seal apparatus of claim 10, wherein one of:
said transition channel defines a first transition passage between said first transition lip member and said first vane lip member and said vane channel defines a first vane passage between said second transition lip member and said second vane lip member, said first transition passage and said first vane passage at least partially defining said labyrinth path; and
said vane channel defines a first vane passage between said first vane lip member and said first transition lip member and said transition channel defines a first transition passage between said second vane lip member and said second transition lip member, said first vane passage and said first transition passage at least partially defining said labyrinth path.

12. The seal apparatus of claim 11, wherein a portion of said transition channel that does not include said first transition passage and a portion of said vane channel that does not include said first vane passage cooperate to define a common channel that further defines said labyrinth path.

13. The seal apparatus of claim 1, further comprising an auxiliary seal structure associated with one of the transition duct and the vane structure, said auxiliary seal structure comprising:
an auxiliary base portion associated with the one of the transition duct and the vane structure, said auxiliary base portion defining a third axially facing surface;
a first auxiliary lip member extending axially from said third axially facing surface of said auxiliary base portion; and
a second auxiliary lip member radially spaced from said first auxiliary lip member and extending axially from said third axially facing surface of said auxiliary base portion such that an auxiliary channel is defined between said first auxiliary lip member, said second auxiliary lip member, and said auxiliary base portion, wherein:
said first auxiliary lip member abuts one of said second transition lip member and said second vane lip member;
said first auxiliary lip member is located within one of said transition channel and said vane channel; and
said auxiliary channel further defines said labyrinth path.

14. The seal apparatus of claim 1, wherein at least one of said first transition lip member, said second transition lip member, said first vane lip member, and said second vane lip member comprises at least one of an abradable coating and a thermal barrier coating.

15. A seal apparatus in a gas turbine engine between a transition duct and a vane structure in a first row vane assembly, said seal apparatus comprising:
a transition seal structure associated with the transition duct, said transition seal structure comprising:
a transition base portion associated with the transition duct and defining a first axially facing surface;
a first transition lip member extending axially from said first axially facing surface; and
a second transition lip member radially spaced from said first transition lip member and extending axially from said first axially facing surface;
a vane seal structure associated with the vane structure, said vane seal structure comprising:
a vane base portion associated with the vane structure and defining a second axially facing surface;

a first vane lip member extending axially from said second axially facing surface; and a second vane lip member radially spaced from said first vane lip member and extending axially from said second axially facing surface;

a seal member located between said transition seal structure and said vane seal structure, said seal member limiting a leakage of fluids through the seal apparatus; and wherein said first transition lip member overlaps said first vane lip member in an axial direction and said second transition lip member overlaps said second vane lip member in the axial direction.

16. The seal apparatus of claim 15, wherein:

a transition channel is defined between said first transition lip member, said second transition lip member, and said transition base portion;

a vane channel is defined between said first vane lip member, said second vane lip member, and said vane base portion; and said transition and vane channels define a labyrinth path for fluids passing through the seal apparatus.

17. The seal apparatus of claim 16, wherein:

said seal member is located in at least one of said transition channel and said vane channel;

said seal member comprises at least one point of contact with said transition seal structure; and said seal member comprises at least one point of contact with said vane seal structure.

18. The seal apparatus of claim 17, wherein said seal member comprises a rigid portion and a flexible portion and includes at least three total points of contact with said transition seal structure and said vane seal structure.

19. The seal apparatus of claim 15, wherein:

the transition duct comprises a first radially facing surface that faces a centerline of the transition duct;

said transition seal structure comprises a second radially facing surface that faces said centerline of the transition duct;

said vane seal structure comprises a third radially facing surface that faces said centerline of the transition duct;

said second radially facing surface of said transition seal structure is located radially further from said centerline of the transition duct than said first radially facing surface of the transition duct; and said third radially facing surface of said vane seal structure is located radially further from said centerline of the transition duct than said first radially facing surface of the transition duct.

20. The seal apparatus of claim 15, wherein one of:

both said first and second vane lip members are located in said transition channel;

both said first and second transition lip members are located in said vane channel;

said first vane lip member is received in said transition channel and said second transition lip member is received in said vane channel; and said first transition lip member is received in said vane channel and said second vane lip member is received in said transition channel.

* * * * *